Patented Jan. 9, 1923.

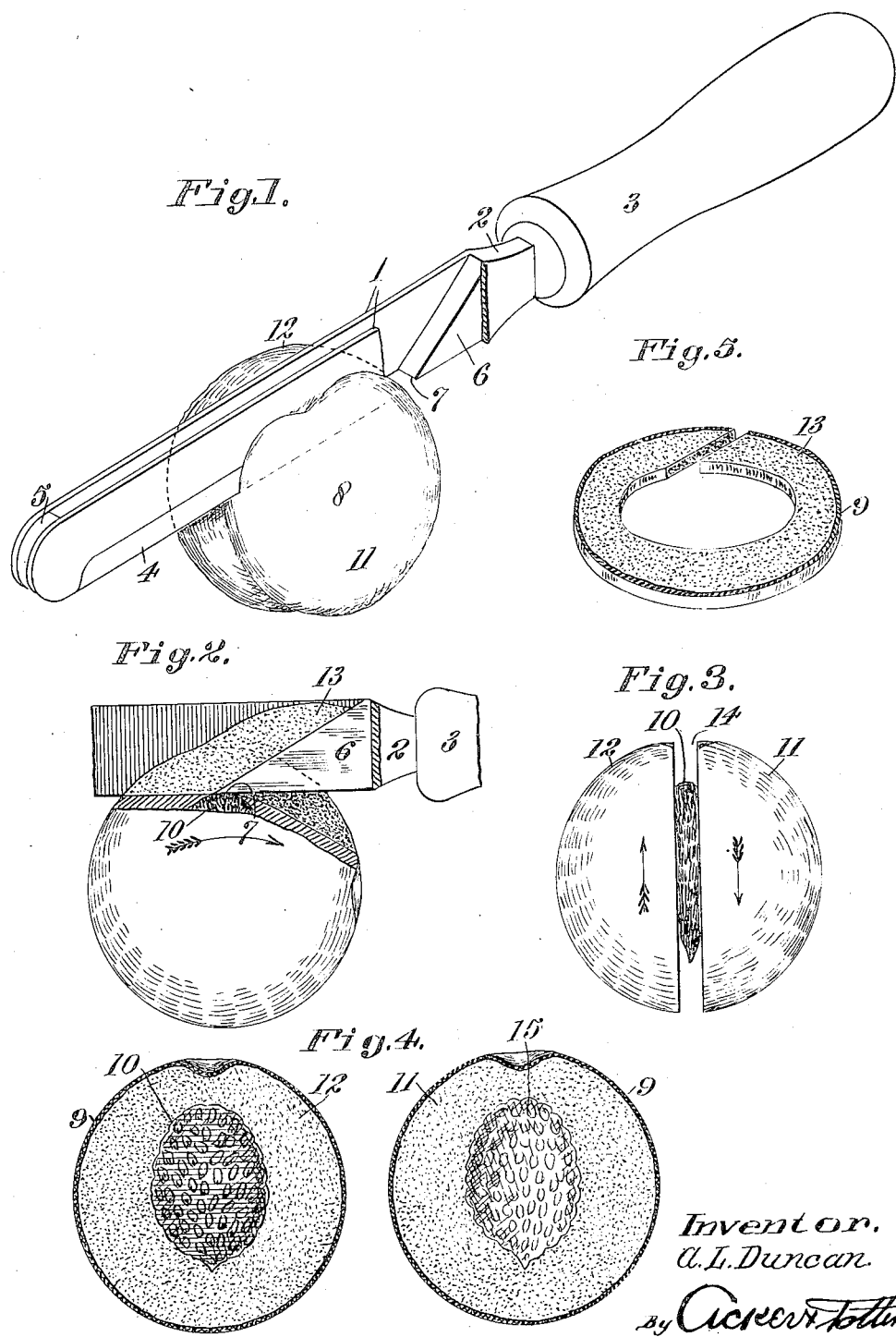

1,441,490

UNITED STATES PATENT OFFICE.

ARTHUR L. DUNCAN, OF OAKLAND, CALIFORNIA, ASSIGNOR OF ONE-THIRD TO E. H. DUNCAN AND ONE-THIRD TO CHARLES E. FORRY, BOTH OF OAKLAND, CALIFORNIA.

METHOD OF PREPARING FRUIT FOR CANNING.

Application filed November 10, 1922. Serial No. 600,143.

*To all whom it may concern:*

Be it known that I, ARTHUR L. DUNCAN, a citizen of the United States, residing at Oakland, in the county of Alameda, and State of California, have invented certain new and useful Improvements in Methods of Preparing Fruit for Canning, of which the following is a specification.

It has been discovered that peaches halved, free from rough and ragged cut edges retain a better appearance when canned and demand a higher retail price when sold, than the ordinary halved peaches having rough and ragged cut surfaces.

Peaches as at present prepared for canning are cut annularly by a single blade knife and the halves are separated from each other, and one from the stone by a twisting movement in an opposite direction, after which time the stone is removed from the other half. This preparation of the fruit necessitates the further cutting of the fruit to smooth the cut edges so that the fruit will retain a good appearance when canned, as the contacting of the opposing cut edges during the twisting of the halves causes a roughing of these surfaces.

My present invention relates to an improved method for preparing fruit and wherein the fruit is severed into halves, separated by an annular space which extends from the skin to the stone or core, enabling the half sections to be separated from the stone or core by imparting to them a twisting motion in opposite directions. The particular advantage by this present method is the preparing of the fruit with smooth, even, cut surfaces, which enables a better appearance to be retained by the canned fruit than when cut by the well known manner now employed, and enables the packer to obtain a high retail price for his goods.

To more fully comprehend the invention, reference is directed to the accompanying drawings, wherein—

Fig. 1 is a view in perspective of one form of implement utilized in severing the annular strip from the fruit in the carrying out of my method invention.

Fig. 2 is a fragmentary sectional view of the implement and the fruit, illustrating the manner of cutting and removing the strip from the fruit, forming the half sections.

Fig. 3 is a view of the fruit with the strip removed therefrom, the arrows illustrating the direction in which the halves are twisted on a substantially common axis.

Fig. 4 is a view in elevation of the separated halved sections illustrating the stone retained by one.

Fig. 5 is a view in perspective of the strip which has been cut and removed from the fruit, and which is utilized in the canning of what is commonly termed "pie fruit."

In carrying out my method, I employ the cutting implement, particularly illustrated in Fig. 1, and comprising the parallel cutting blades 1 extending outwardly from the base 2 secured to the handle 3. The blades are formed with cutting edges 4 and to maintain the same in parallel relation and rigid, are united at their outer ends, as at 5. The inner ends of the blades are united by a wall 6 inclined outwardly from the cutting edges toward the back of the blades in a direction toward the handle 3, the lower edge of said wall forming a cutting edge 7 transversely between the inner edges of the blades.

In using the tool or implement the operator grasps the handle of the same in one hand and the peach 8 to be prepared in the other and exerts pressure on the blades to force the same into the flesh of the fruit from the peel 9 to the stone 10. Rotation is then imparted to the fruit 8, as in Fig. 2, while the blades are held in contact with the stone 10, or if the operator finds it more expedient, the fruit 8 may be held stationary and the blades moved at intervals circumferentially thereof. The relative movement of the blades and fruit as illustrated in Fig. 2, causes the cutting edges 4 of the blades to separate the fruit into halves 11 and 12, and to remove from therebetween a strip of fruit 13, which strip is cut from the stone by the blade 7, and is expelled from between the blades by being caused to travel upwardly on the wall 6, as illustrated in Fig. 2. This strip of fruit severed from the whole fruit provides between the halves 11 and 12 an annular space 14. The strip 13 is not wasted as the same is of the desired thickness to be readily utilized as "pie fruit."

The parallel blades 1 of the implement and the transverse blade 7 in this cutting operation forms true smooth edges on the inner cut surfaces of the halves 11 and 12, and the space between the cut surface of said halves enables said halves to be twisted on a substantially common axis in the direction of the arrows—Fig. 3, in opposite directions on the stone 10.

In carrying out my method, the operator after the strip 13 is removed from the whole fruit, grasps the halves 11 and 12 in the hands and imparts a twisting motion in the opposite direction to the opposing halves, which causes one-half to break from the stone 10 without a rubbing action between the adjacent cut surfaces, which would tend to make the same rough or ragged, and this breaking leaves the natural pit or stone recess 15 in one half. The operator then removes the stone 10 from the other half in any suitable manner as by the well known type of knife or implement used for this purpose.

It is obvious that the implement illustrated is but one form of device adapted for the carrying out of my method invention, and that by my method invention the halves of the fruit separated by the strip removed from between the same are capable of separation from the stone and from each other by an axial twisting movement without their surfaces contacting.

It will be understood that while the foregoing method invention has been described for the purpose of preparing fruit preparatory to canning, that it is equally as well applicable to the preparing of the fruit for drying purposes, and therefore wherever the expression "for canning purposes" has been used herein and in the appended claims I wish to be understood as covering the invention as applied to drying purposes of fruit with the stone, pit, or core removed therefrom, under and in accordance with my method invention.

Having thus described my invention, what I claim as new and desire to protect by Letters Patent of the United States is as follows:—

1. The method of preparing fruit for canning, which consists in cutting and removing an annular slice from the fruit to the depth of the flesh to separate the fruit into halves, and then separating the halves from the stone or core.

2. The method of preparing fruit for canning, which consists in cutting and removing an annular slice from the fruit to the depth of the flesh to separate the fruit into halves, then twisting the halves on a common axis in opposite directions to separate one from the stone or core, and then removing the stone from the other half.

3. The method of preparing fruit for canning, which consists in cutting and removing an annular unbroken slice from the fruit to the depth of the flesh to sever the fruit into halves, and then separating the halves from each other by twisting the same in opposite directions on a substantially common axis.

4. The method of preparing fruit for the removal of the stone, pit or core therefrom preparatory to canning, which consists in dividing the fruit into a plurality of sections by severing therefrom to the depth of the stone, pit or core, an annular section or slice.

5. In the method of preparing fruit for the removal of the stone, pit, or core therefrom preparatory to canning, the step of which resides in separating the fruit into sections by severing therefrom to approximately the depth of its stone, pit or core an annular section or slice.

6. The method of preparing fruit for the removal of the stone, pit or core therefrom preparatory to canning, which consists in separating the fruit into sections by severing therefrom to approximately the depth of its stone, pit or core an annular section or slice, and then removing the annular section or slice together with the stone of the fruit from the separated sections.

In testimony whereof I have signed my name to this specification.

ARTHUR L. DUNCAN.